April 5, 1949.   P. W. MARTIN   2,466,251
METHOD OF AND APPARATUS FOR MEASURING
THE LENGTH OF MAGNETIC MATERIAL
Filed Feb. 28, 1944   3 Sheets-Sheet 1

Inventor
PHILIP W. MARTIN.
By
Attorney

Inventor
PHILIP W. MARTIN.
By
Attorney

April 5, 1949.                    P. W. MARTIN                      2,466,251
                    METHOD OF AND APPARATUS FOR MEASURING
                            THE LENGTH OF MAGNETIC MATERIAL
Filed Feb. 28, 1944                                          3 Sheets-Sheet 3

Fig. 6

Inventor
PHILIP W. MARTIN.
By
Attorney

Patented Apr. 5, 1949

2,466,251

UNITED STATES PATENT OFFICE 2,466,251

METHOD OF AND APPARATUS FOR MEASURING THE LENGTH OF MAGNETIC MATERIAL

Philip W. Martin, Huntington Park, Calif.

Application February 28, 1944, Serial No. 524,215

16 Claims. (Cl. 175—183)

My invention relates to means for linear measurement, and relates in particular to a means for measuring objects such as drill pipe, tubing, casing, and cable which are extended for long distances through inaccessible places, and is particularly useful for measuring elongated members while they are in continuous motion and are traveling at relatively high or low speeds.

It is an object of the invention to provide a method and means for measuring a subject member, wherein small marks are placed at known distances along the subject which is measured, and wherein each mark controls the placing or the forming of the succeeding mark.

A further object of the invention is to provide a method and apparatus for measuring a subject wherein spaced marks are placed or formed on or in the subject in the manner described and a record of these marks is accumulated as the marks are consecutively formed.

In the preferred practice of the invention I employ a two-way or reversing counter to record the application of marks to the subject as it is moved forwardly and to subtract the number of marks which pass in reverse direction.

It is an object of the invention to provide a method and apparatus for measuring an elongated part wherein a mark is applied at a marking station and then the part is moved continuously from the marking station toward a recording station having thereat means which respond to the marks and controls the application of a succeeding mark to the subject part each time a mark on the subject part passes or is brought into conjunction with the responsive means, thereby marking off on the subject part consecutive distances which are recorded and accumulated so that the total length of the subject part is thereby measured.

An object of the invention is to provide a method and apparatus for measuring a subject part wherein the marks comprise small polarized magnetized segments of the subject having magnetic fields which are uniformly polarized and wherein the magnetic fields of the magnetized sections are polarized in alignment with the line of movement of the subject part.

A further object of the invention is to provide a method and apparatus wherein the subject part is magnetically normalized or demagnetized during its movement toward the marking section; wherein the magnetic normalization or demagnetization is accomplished in a new and improved manner.

A further object of the invention is to provide a method and apparatus of the character herein described wherein the responsive means is of electronic character and is actuated or controlled by the effects of the magnetic fields of the marks as they are brought in conjunction to a designated part or parts of the responsive means.

Although not limited to this use, the invention is of especial utility for the measurement of an elongated member such as a string of drill pipe, tubing, or cable, as the same is lowered into a well, whereby the distance of the lower end of such member may be accurately determined at any time, and the invention is of especial value for determining the distance which a specialized tool or instrument may be lowered into a well. For example, in the well drilling art it is customary to first bore a well to an oil stratum and to determine the exact depth of such stratum in order to be able to know at what depth to perforate the casing and to later perforate casing with such accuracy as may be obtainable. The invention makes possible great accuracy in the measuring of any member which may be lowered into a well.

Further objects and advantages of the invention will be brought out in the following part of the specification.

Referring to the drawings which are for illustrative purposes only,

Fig. 3 is an enlarged sectional view through the cathode-ray tube shown in Fig. 2.

Fig. 4 is a fragmentary section taken as indicated by the line 4—4 of Fig. 3.

Fig. 5 is an enlarged view of a section of cable having a magnetic field or mark.

Fig. 6 is an electrical diagram including another type of pick-up device which may be used in the practice of the invention.

Figure 1:
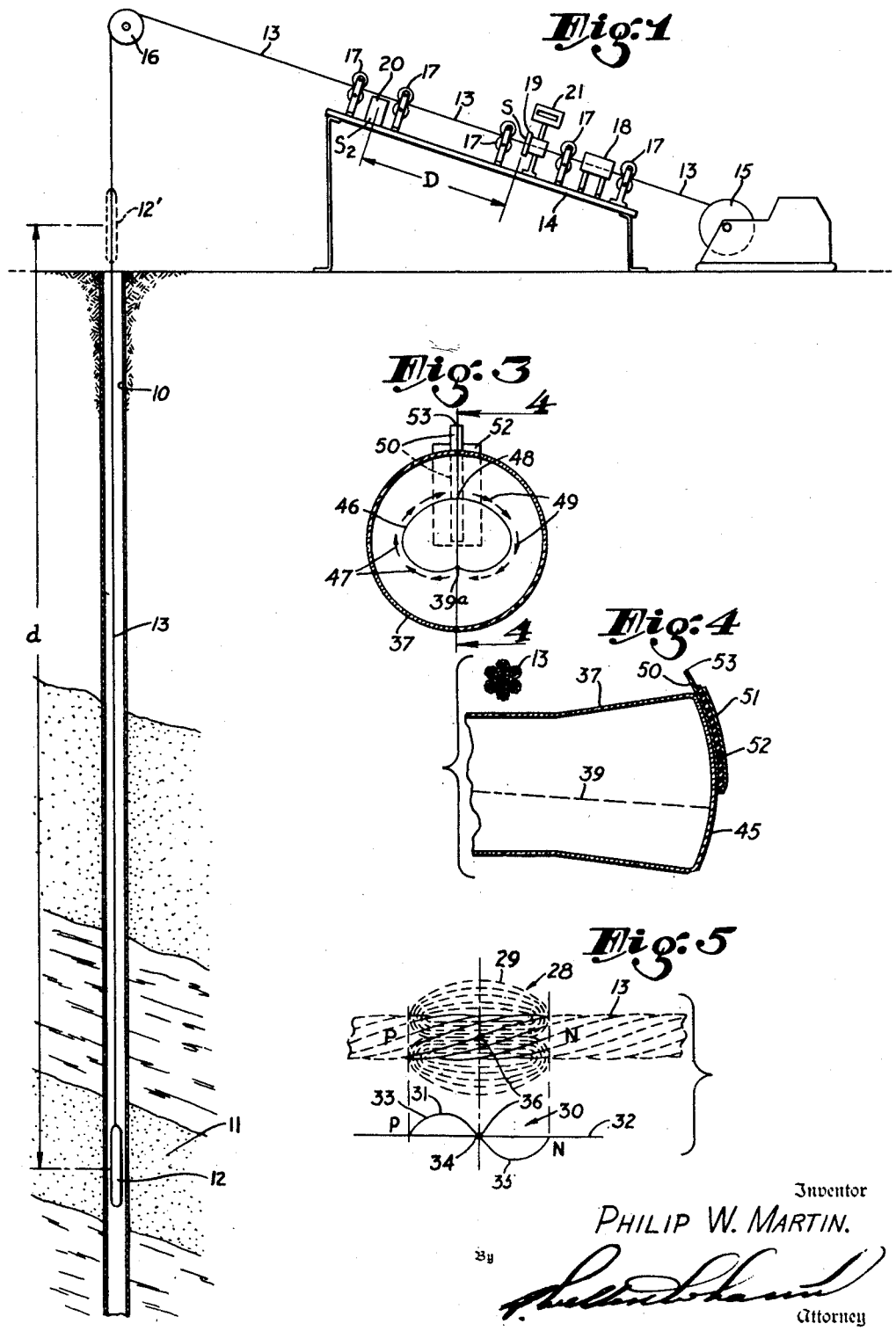
Fig. 1 is a schematic view showing a preferred embodiment of my invention and an important manner of its use.

An important use of the invention is in the measuring of a sand line or cable by which a perforating gun is lowered into a well, so as to accurately locate the gun with reference to a selected formation. In Fig. 1 I have schematically shown piping 10 extending down into a well so as to intersect a formation 11. A perforating gun 12 is shown suspended by means of a cable 13 in a position adjacent the zone 11. To accurately locate the gun 12, when the formation 11 is at considerable distance below the top of the well, is bound to be very difficult, and even though specialized measuring devices have been made for the purpose of measuring the cable as it is moved into the well, inaccuracies have resulted and many times perforating guns have been fired either above or below the intended level, even though great care has been exercised during the lowering of the gun into the well. In my present invention I accomplish measurement of the cable without resorting to the use of the measuring wheels or sheaves and without the necessity of carrying the cable around sheaves or drums during the measuring process.

As further shown in Fig. 1, my measuring device 14 has means for establishing a substantially straight line of movement for the cable 13 as it passes from a spool 15 to a guide sheave 16. This path of movement for the cable 13 is defined by cooperating pairs of sheaves 17. Along this path of movement of the cable, the invention has a means 18 for preparing the cable, a marking means 19, and a responsive or marker actuating means 20. The purpose of the device 18 is to remove from the cable any previously formed marks or simulations of marks which might produce operation of the actuating means 20. The marking means 19 is disposed in a location or position along the path of movement of the cable 13 which may be referred to as the first station or marking station S and the responsive or actuating means 20 disposed in a second station S2 spaced at a distance D from the station S. In the operation of the device, the cable 13 may be moved continuously or intermittently at slow speed or at high speed, and as the cable is moved toward and into the well, accurately spaced marks are placed thereon, to mark off unit distances along the cable, and the number of these unit distances is recorded by means of a counting device 21. A feature of the invention is that each mark which has been made by the marking device 19 in the marking station S, when it reaches the actuating device 20 in the second station S2, will cause or control the application of a succeeding mark to the cable at a distance D from the mark which is positioned in the second station S2. Simultaneously with the application of a mark, the counter 21 is actuated, thereby recording the number of unit distances D which have been marked off on the cable as it moves toward the well. Owing to the scientific principles involved in the method and apparatus comprising my invention, a high degree of accuracy of measurement is maintained. For example, the error in measuring a four thousand foot length cable may be maintained within one-half inch.

Figure 2:
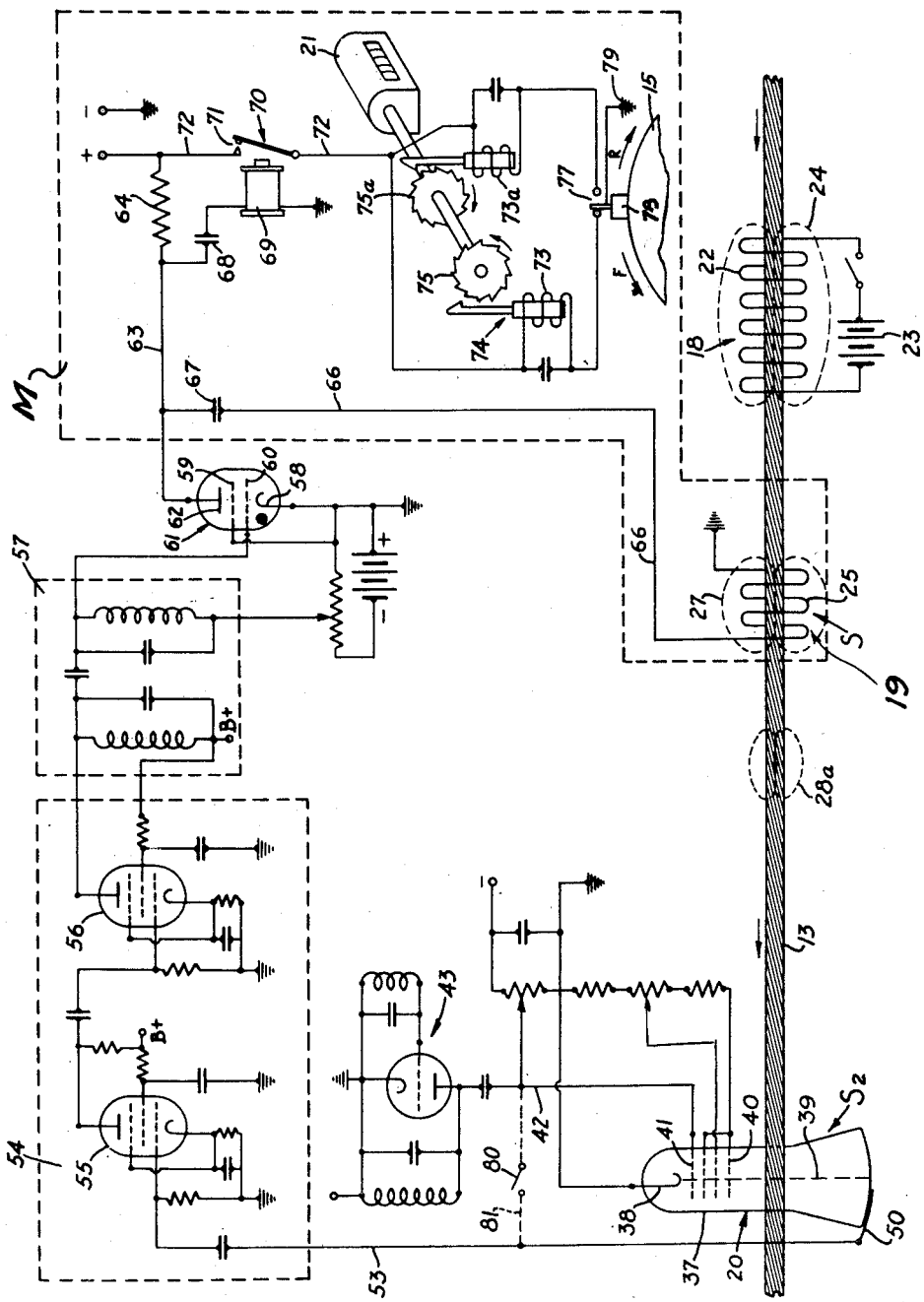
Fig. 2 is an electrical diagram of the measuring device shown in Fig. 1.

In the preferred form of my invention, as shown in Fig. 2, I employ electrical means and effects in such relation as to follow out the inventive concept. Therein the means for preparing the cable consists of a coil 22 of wire defining an opening through which the cable 13 moves. This coil is energized from a source of direct current such as a battery 23, so as to produce a constant unipolar field of magnetic flux, as indicated by dotted lines 24, coaxial with the cable, this magnetic field, as the cable is moved therethrough, normalizing the magnetic effects within the cable and wiping spots of magnetism therefrom by the process of demagnetization. In the marking station S I employ a marking means 19 consisting of a coil 25 through which the cable passes, which coil 25 is instantaneously energized with direct current flow therethrough so as to produce a field 27 of magnetic flux coaxially of the cable 13. The magnetic field 27 is instantaneously applied. That is to say, its duration is only for a small fraction of a second. Accordingly, it results in magnetizing a short segment of the cable so that this short segment of the cable then becomes a small permanent magnet constituting a mark in the cable structure. Otherwise stated, the magnetic field of this small magnetized segment of the cable constitutes a mark on the cable. In Fig. 5 I have shown a portion of the cable 13 having a mark consisting of a short magnetized segment 28 of the cable having a magnetic field 29 coaxially of the cable so that its poles are spaced lengthwise of the cable. The polarity of the magnetized segment 28 is of little importance, but for purpose of illustration, I have shown the positive pole to the left and the negative pole thereof to the right. The tendency of the magnetic field 29 to induce a current in a theoretical rotating armature located at one side of the path of movement of the field 29, and past which the magnetic field 29 is moving, is indicated by the curve 31. The beginning of the curve 31 indicates a point in the approach of the magnetic field to such theoretical armature, where the magnetic field has just begun to intersect the conductor and the current is therefore substantially zero. As the lines of force are cut by the conductor with the forward movement of the magnetic field, the intensity of the current will rise on the positive side as indicated at 33, and as the center of the magnetic field approaches a point directly above such theoretical armature, the current will drop back through zero. As the magnetic field moves away from the conductor, the current will increase and decrease on the negative side, as indicated by the portion 35 of the curve lying below the datum line 32. The point 34 in the graph portion 30 of Fig. 5 thus indicates a zero or null point in the theoretical armature current, and the point 36 is the point in the magnetic field (the center of the magnetic field) which is opposite the theoretical armature when this zero effect is produced. This characteristic of the magnetic field is of importance in producing the effect of bending a cathode ray in a roughly elliptical path in which, at one point thereof, it intersects an electrode to trigger the marking and recording operation which will be described hereinafter.

In Fig. 2 the responsive device 20 in station S2 is an electronic device wherein the movement of electrons is responsive to the magnetic field 29 of a magnetized segment which has been formed in the cable 13 by the marking coil 25. At this point I employ a form of cathode-ray tube 37 having a filament 38 from which a stream of electrons passes as indicated by the dotted line 39, this stream being focused by use of focusing electrodes 40 in accordance with customary practice in cathode-ray tubes. The cathode-ray tube 37 has a blocking grid 41 which is connected through a conductor 42 with a simple oscillator 43 which accordingly produces an oscillating potential in the grid 41.

As shown in Figs. 2 and 4, the cable 13 passes along a side of the cathode-ray tube 37. As shown in Fig. 4, the electron stream 39 occupies the position indicated, except when a marker or magnetized segment 28 passes through the station S2, this position of the electron stream being indicated by the point 39a in Fig. 3. As the magnetized segment 28 passes the side of the cathode-ray tube 37, the magnetic field 29 deflects the stream of electrons in such manner that the electron stream will describe on the end wall 45 of the tube 37 an oval path such as indicated at 46 in Fig. 3. For example, assuming that the magnetized segment 28 of Fig. 5 is moving leftward, as it approaches the electron stream 39, such stream will be deflected so that the point 39a of Fig. 3 will move as indicated by arrows 47, and when the center or null point 36 of the magnetized segment 28 is in centralized relation to the tube 37, the point 39a will have reached the position 48 in the oval path 46 diametrally opposite the initial position of the point 39a, and as the movement of the magnetized segment 28 is continued, the remaining half of the oval path 46 will be completed, as indicated by arrows 49. On the end wall 45 of the tube 37 I place a narrow elongated electrode 50 in such position that it will lie on a line which passes through the points 39a and 48 of Fig. 3, and in such position that the inner end of the electrode 50 will be spaced from the point 39a. This electrode 50 may consist of a strip of metal foil of about one-eighth of an inch wide. Over it I place a larger piece of foil to form a shield electrode 51, which, as shown in Fig. 4, is separated from the electrode 50 by insulation 52. When a marker or magnetized segment 28 passes the responsive means represented by the cathode-ray tube 37, the electron stream 39 will describe the oval path 46, and as the center of the magnetized segment 28 passes the cathode-ray tube 37, the electron stream will pass under or across the narrow electrode 50, at the point 48 of Fig. 3, and during this time of passage a potential impulse will be imposed upon the electrode 50. This potential impulse may be a number of oscillations, depending upon the rate of movement of the segment 28 past the tube 37 and the oscillating frequency of the oscillator. For example, I have found that a frequency of 15 kilocycles per second in the oscillator 43 will produce satisfactory results. If the electron stream 39 has potential oscillations at this rate, and it takes 1/1000 of a second for the electron stream to traverse the electrode 50 from one side to the other thereof, the potential impulse applied to the electrode 50 at this time will comprise fifteen oscillations.

A feature of the preferred form of the invention is that the momentary application of electronic impulse to the electrode 50 is employed as controlling energy for producing a succeeding mark on the cable when a magnetized segment 28 reaches a position centralized with respect to the cathode-ray tube 37. This controlling impulse received by the electrode 50 produces or controls an instantaneous flow of electric current through the marking coil 25, Fig. 2, in the following manner so as to produce the succeeding magnetized segment in the cable 13.

The controlling impulse from the electrode 50 is carried through a conductor 53 to an amplifying means 54 of suitable gain. For this purpose, I have employed the arrangement shown in Fig. 2, consisting of pentode tubes 55 and 56 in conjunction with the condensers and resistances diagrammatically shown in the amplifier 54, in keeping with the known practices followed in the use of electronic amplifiers.

The output of the amplifiers 54, or, in other words, the amplified oscillations, are passed through a filter 57 which is tuned to the frequency of the oscillator 43. This filter 57 has the purpose of filtering out stray potential impulses which may be imposed on the system. The amplified oscillations from the filter 57 are imposed on the control grid 60 of an electronic valve 61, causing the same to discharge and ionize. The plate 62 of the tube 61 is connected to a conductor 63 which extends to the marking and recording device M and which is connected through a resistance 64 with the positive pole of a direct current source, the purpose of the resistor 64 being to delay for a short period of time—for example, one-tenth of a second—the recovery of the tube 61 after it has been discharged. In parallel relation to the connections of the tube 61 with the current source, the marking coil 25 is connected to the conductor 63 through a condenser 67, at a point between the plate 62 and the resistor 64. Through a second condenser 68 the winding 69 of a magnetic relay 70 is connected parallel with the tube 61, this relay 70 having a switch 71 which is closed by the passage of current through the winding 69, so that a current impulse will be passed through a conductor 72 to the winding 73 of an electromagnet 74 which actuates a forward-counting ratchet 75 associated with the recorder or counter 21.

The counter 21 is also provided with a reverse-counting ratchet 75a arranged to be actuated by an electromagnet 73a. Whether the electromagnet 73 or the electromagnet 73a will be in circuit with the switch 71 depends upon the direction of movement of the cable 13. For example, when the cable spool is rotating forwardly so as to permit a forward movement of the cable, a switch 77, which has a part 78, frictionally engaging the cable spool, will connect the electromagnet 73 with a ground 79. Reverse rotation of the drum 15 will move the part 78 in rightward direction, thereby connecting the electromagnet 73a in series with the switch 71 and the ground 79. Then, the actuation of the device 20 by magnetized segments of the cable 28 of the cable 13 moving in reverse direction will result in consecutive actuations of the electromagnet 73a, whereby the ratchet 75a will operate the counter 21 in reverse direction to subtract from the total shown by the counter 21 the value of the cable footage withdrawn from the well.

A special feature of the invention is that the control of the marking and recording device is independent of the size of the magnetized segment, for the reason that the discharge of the tube 61 occurs only when the electron beam 39 passes across the position of the electrode 50. This sweeping of the electron beam 39 across the electrode 50 occurs when the center of the magnetized segment 28 passes the central plane of the tube 37, regardless of the length or strength of the magnetized segment 28, and therefore great accuracy in the spacing of the segments 28 is assured.

The operation of the device shown in Fig. 2 is as follows. During the time a mark or magnetized segment of the cable 13 is moving from the marking station S toward the station S2, as indicated at 28a in Fig. 2, the blocking grid 59 of the electronic valve 61 is continuously charged with a blocking potential, so that there will be no possibility of discharge of the tube 61 at this time. When the magnetized segment 28 reaches a prescribed position with relation to the cathode-ray tube 37, a potential impulse will be initiated from the electrode 50 and through the conductor 53 and amplifying and filtering means 54 and 57, which will offset or oppose the blocking potential in the tube 61 and cause the same to discharge. The potential impulse which accomplishes the discharge of the tube 61 is ordinarily the first oscillation of the oscillating impulse which reaches the control grid 60 of the tube 61. The discharge of the tube 61 results in a heavy potential surge in each of the condensers 67 and 68, with the result that an instantaneous marking current is passed through the marking coil 25 and an actuating current is passed through the winding 69 of the electromagnet switch 70 so that a current flow will pass through the conductor 72 to the electromagnet 74 of the counting device 21. Therefore, each time a previously formed magnetized segment 28 passes a specified position with relation to the cathode-ray tube 37, both the marking means 19 and the counter 21 will be simultaneously actuated, and as the result of this cooperative action, consecutive unit lengths will be laid off on the cable 13, even though the cable 13 is moving forward at a relatively high rate of speed, for example, from 300 to 500 feet per minute, and each unit of length will be counted or recorded so that the amount of cable which has been moved into the well, or the distance which the object or tool, such as the gun 12 of Fig. 1, has been moved in the well may be accurately determined.

An example of the use of the preferred form of the invention may be explained as follows. For this example let it be assumed that the gun 12 is to be lowered from the position 12' of Fig. 1 through the distance d to the position in which it is shown in full lines adjacent the formation 11. The actual length of cable which must be fed into the well in order to bring the gun 12 to the desired position is computed. If the amount of cable which must be fed into the well in order to bring the gun 12 to a desired position is 4285 feet, 3½ inches, for example, and the unit distance D is 10 feet, a procedure such as follows may be employed. The gun is brought first into the position 12'. The counter 21 is set at one point behind zero. The marking means is then actuated by causing energization of the marking coil 19, and simultaneously therewith, the counter is actuated so as to bring it to zero or starting point. This initial actuation of the measuring device may be accomplished as follows. With the parts of the device shown in Fig. 2 all electrically energized, a switch 80, in a conductor 81 which connects the conductors 42 and 53, is closed momentarily so that an oscillating potential will pass from the oscillator 43 to the amplifier 54. This will result in a discharge of the tube 61 and actuation of both the marking means 19 and the counter 21. The movement of the cable is then started into the well and the measuring device will thereafter operate to mark off unit lengths of 10 feet therealong. The feeding of the cable into the well is continued until the counter indicates that 428 units of length D, or, in other words, 4280 feet have been fed into the well. The cable is then allowed to advance an additional five feet, three and a half inches, thereby locating the gun 12 in the well with a close approach to accuracy. There are other ways, of course, in which the measuring device can be actuated—for example, by moving a short bar magnet across the face of the cathode-ray tube 37, or by momentarily grounding the conductor 63 so as to discharge the condensers 67 and 68.

In the form of the invention shown in Fig. 6 I employ the marking and counting device M which has been described with relation to Fig. 2. The conductor 63 is connected to an actuating device 90 having two gas filled tubes 91 and 92 so connected that they can be alternately ionized, but not otherwise. Each time the tube 92 discharges, the device M will be actuated.

In this alternative form of the invention a whirling armature 84 is disposed along the path of movement of the cable in spaced relation to the marking coil 25. It is driven at relatively high speed by a motor 84a. The armature 84 has a commutator 94 and opposed brushes 95 and 96 connected respectively through conductors 85 and 86 with the grids of the tubes 91 and 92.

When the magnetized segment 28a approaches the whirling armature 84, a positive charge is transmitted through the conductor 85 to the grid of the tube 91, causing the tube 91 to ionize, and in the same action, causing the tube 92 to deionize, the tube 92 remaining in this condition until the center of the magnetized segment 28a has reached a point slightly past the midpoint of the armature, at which point the polarity of the armature 84 reverses so that a positive charge then is transmitted through the conductor 86 to the grid of the tube 92, causing it to then ionize and discharge the condensers 67 and 68, and at the same time deionize the tube 91. The tube 92 cannot again discharge until the tube 91 has been discharged as the result of the approach of the next consecutive magnetized segment to the armature 84.

In place of the whirling armature 84, I may use a Waugh magnetometer or other magnetic detector which will produce the desired electrical changes in the conductors 85 and 86 when a magnetized segment moves through the station S2 of the measuring apparatus.

The term normalizing as referred to herein and as employed in the claims is any process which will bring the member 13 to one magnetic level through its entire length or at least to such a level that it will not in any way effect the detecting device 20. This may be done by drawing the member to be marked through a strong magnetic field of either direct or alternating nature. It is understood that the alternative of moving the device and leaving the part to be measured stationary would be equally as satisfactory.

I claim as my invention:

1. In a measuring device of the character described, the combination of: means establishing a path of movement for the member to be measured; marking means disposed along said path of movement, actuatable to apply a magnetic mark to said member, said mark having a field of magnetic flux; means disposed along said path of movement responsive to the magnetic flux of said mark to actuate said marking means, said actuating means comprising an electron tube means having a path of electron flow wherein the flow of electrons in said path of flow is controlled by the flux field of said magnetic mark, and means acting in response to control of electrons in said electron tube means to actuate said marking means when said mark and other similar marks are brought into cooperative relation to said electron tube means, whereby consecutive unit distances will be marked off on said member; and means adapted to indicate the number of unit distances marked off on said member by said marking means.

2. In a measuring device of the character described, the combination of: means establishing a path of movement for the member to be measured; marking means disposed along said path of movement, actuatable to apply a magnetic mark to said member, said mark having a field of magnetic flux; means to actuate said marking means, said actuating means comprising a cathode ray tube having a flow of electrons which are deflected in the presence of the flux field of said magnetic mark, and means acting in response to deflection of said electrons to actuate said marking means when said mark is brought into cooperative relation to said tube, whereby consecutive unit distances will be marked off on said member; and means actuated by said responsive maens for indicating the number of unit distances marked off on said member by said marking means.

3. In a measuring device of the character described for linear measurement of a member of magnetizable material, the combination of: means establishing a path of movement for the member to be measured; marking means disposed along said path of movement, actuatable to apply a magnetic mark to said member, said mark having a field of magnetic flux; means to actuate said marking means, said actuating means comprising a responsive means spaced from said marking means along said path of movement, said responsive means having the ability of responding to the flux field of a mark applied to said member by said marking means, whereby consecutive unit distances will be marked off on said member; and means actuated by said responsive means for indicating the number of unit distances marked off on said member by said marking means.

4. In a measuring device of the character described, for linear measurement of a member of magnetizable material, the combination of: means establishing a path of movement for the member to be measured; marking means disposed along said path of movement, actuatable to apply a magnetic mark to said member, said mark having a field of magnetic flux; and means to actuate said marking means, said actuating means comprising a cathode ray tube having a flow of electrons which are deflected in the presence of the flux in said field of said magnetic mark, and means acting in response to deflection of said electrons to actuate said marking means when said mark is brought into cooperative relation to said tube, whereby consecutive unit distances will be marked off on said member.

5. In a device for measuring the length of a slender member of magnetizable material, the combination of: a coil defining an opening through which said member is moved; means to electrically energize said coil; a marking coil defining an opening through which said member may pass after it has left said first named coil, electric energization of said marking coil acting to magnetize a segment of said member; responsive means spaced from said marking coil, said responsive means being located a known distance from said marking coil and comprising an electron tube means having a path of electron flow wherein the flow of electrons may be controlled by the field of said segment when the same is moved past said tube; and means actuated in response to control of said electron flow of said tube to energize said marking coil, thereby marking off on said member a unit length corresponding to said known distance.

6. A method of measuring the length of a member of magnetizable material, comprising: moving the member past a marking station and then past a control station which is spaced a predetermined measured distance from the marking station; applying a magnetic mark to the member at the marking station; utilizing said magnetic mark as it passes the control station to actuate a control device which is responsive to the magnetic field of said mark; utilizing the actuation of said control device to control the application of a succeeding mark to the member at the marking station; and utilizing said marks to control the actuation of a counter so as to provide a record indicative of the sum of the unit distances between said marks and thus of the length of the member.

7. A method of measuring the length of a member of magnetizable material suspended in a deep well, comprising: moving the member past a marking station and a control station which are separated from each other a predetermined measured distance; applying to the member at the marking station a mark having a field of magnetic flux; utilizing said magnetic field as it passes the control station in either direction of movement of the member to actuate a control device which is responsive to said magnetic field; and utilizing the actuation of said control device simultaneously to effect the application of a succeeding mark to the member at the marking station when the member is moving into the well and to actuate an adding and subtracting counter in the adding direction when the member is moving into the well and in the subtracting direction when the member is moving out of the well, thereby to provide at all times an indication of the sum of the unit distances between said marks on that portion of the member which is extended into the well.

8. A method of measuring accurately the length of the suspended portion of a member of magnetizable material suspended in a deep well, including the following steps: moving the member past a marking station and a control station which are spaced from each other a measured distance; applying to the member at the marking station a magnetic mark having a magnetic field of flux; utilizing said field of flux at the control station to bend a cathode ray through a path which intersects a target at a point sharply defined with relation to the extent of said magnetic field along the member; utilizing the intersection of said ray with said target simultaneously to effect the application of a succeeding mark to the member at the control station; and utilizing said marks to control the actuation of a counting device for recording the number of marks which have been applied to the member.

9. Apparatus for measuring the length of the suspended portion of an elongatable member suspended in a deep well during the movement of said member, comprising: means establishing a path of movement for a portion of the member adjacent to the mouth of the well; means for applying to said loaded portion a mark having a magnetic field of flux; a control device, responsive to said magnetic field, located adjacent said path at a measured distance from said marking device; a device for registering the mark applied to the member; and common energizing means under the control of said control device and adapted upon each response thereof to simultaneously energize said marking means and said registering device.

10. Apparatus for measuring the length of the extended portion of a member of magnetic material issuing under tension from a mechanism, comprising: means for applying to a stretch of said material just issued from said mechanism a mark having a magnetic field of flux; a control device located adjacent said stretch at a measured distance from said marking means, sensitive to said magnetic field; means for registering the number of marks applied to said member; and common energizing means under the control of said control device, adapted, upon each response of said control device, to simultaneously actuate said marking means and said registering means.

11. Means for applying a series of evenly spaced magnetic marks upon a length of magnetic material, comprising: a device for applying said magnetic mark and a device responsive to said magnetic mark, said two devices being arranged in fixed spaced relationship to each other and to the linear axis of said member while relative movement occurs between said member on the one hand and said two devices on the other hand; and means controlled by said responsive device adapted, upon each response thereof, to energize said marking device to place a succeeding mark upon said member, in spaced relationship to the preceding mark, which spaced relationship corresponds to the spacing between said two devices, said responsive device comprising a cathode ray tube, the ray of which is adapted to be bent in a path forming a closed loop as a magnetic mark moves past said tube, a target associated with said tube adapted to be intersected by said ray at a single point in said closed loop path, and means operating in response to the intersection of said target by said ray, for energizing said marking device.

12. Apparatus for measuring the length of a magnetizable member, comprising: means for applying to the member a mark comprising a magnetized portion of said member having adjacent portions of opposite polarity; a control device adapted when relatively moved past said mark to respond to the magnetic flux and to the change in polarity of said mark so as to actuate said marking means, said control device and marking means being spaced from each other a measured distance along a stretch of the member; means actuated by the response of said control device for energizing said marking means; and means actuated in consequence of the response of said control device for making a record of the number of said responses.

13. Apparatus for measuring the length of a magnetizable member, comprising: means for applying to the member a mark comprising a magnetized portion of said member having adjacent portions of opposite polarity; a control device adapted when relatively moved past said mark to respond to the magnetic flux and to the change in polarity of said mark so as to actuate said marking means, said control device and marking means being spaced from each other a measured distance along a stretch of the member; means for recording the number of said marks applied to said member; and common energizing means, controlled by the response of said control device, for simultaneously energizing said marking means and said recording means.

14. Apparatus for measuring the length of a magnetizable member, comprising: means operable to apply to the member marks, each consisting of a magnetized segment of the member having its magnetic poles spaced lengthwise of the member; a control device adapted when relatively moved past said mark to respond to the magnetic flux and the change in polarity of said segment so as to actuate said marking means, said control device and marking means being spaced from each other a measured distance along a stretch of the member; means adapted to produce simultaneous movement of said control device and said marking means relatively to said member lengthwise of said member; and means actuated by the response of said control device for energizing said marking means.

15. Apparatus for measuring the length of a magnetizable member, comprising: means operable to apply to the member marks, each consisting of a magnetized segment of the member having its magnetic poles spaced lengthwise of the member; a control device adapted when relatively moved past said mark to respond to the magnetic flux and the change in polarity of said segment so as to actuate said marking means, said control device and marking means being spaced from each other a measured distance along a stretch of the member; means adapted to produce simultaneous movement of said control device and said marking means relatively to said member lengthwise of said member; means for recording the number of said marks applied to said member; and means, controlled by said response of said control device, adapted to engage said recording means.

16. Apparatus for measuring the length of the suspended portion of an elongatable member suspended in a deep well during the movement of said member, comprising: means establishing a path of movement for a portion of the member adjacent the mouth of the well; means for applying to said portion a mark having a magnetic field of flux; a control device, responsive to said magnetic field, located adjacent said path at a measured distance from said marking device; a device for registering the mark applied to the member; energizing means under the control of said control device and adapted upon each response thereof to energize said marking means; and means for actuating said registering device so that it will show the number distances marked off on said member by said marks.

PHILIP W. MARTIN.

REFERENCES CITED

The following references are of record in the file of this patent:

UNITED STATES PATENTS

| Number | Name | Date |
| --- | --- | --- |
| 1,603,284 | Johnson | Oct. 19, 1926 |
| 1,841,951 | Hopper | Jan. 19, 1932 |
| 1,954,975 | Zuschlag | Apr. 17, 1934 |
| 2,027,814 | DeLanty | Jan. 14, 1936 |
| 2,083,577 | Perry | June 15, 1937 |
| 2,164,302 | Barnes et al. | July 4, 1939 |
| 2,228,623 | Ennis | Jan. 14, 1941 |
| 2,259,904 | McNamee et al. | Oct. 21, 1941 |
| 2,265,137 | Barnes et al. | Dec. 19, 1941 |
| 2,332,797 | Hume | Oct. 26, 1943 |
| 2,439,446 | Begun | Apr. 13, 1948 |

FOREIGN PATENTS

| Number | Country | Date |
| --- | --- | --- |
| 409,749 | Germany | Feb. 10, 1925 |

Certificate of Correction

Patent No. 2,466,251.

April 5, 1949.

PHILIP W. MARTIN

It is hereby certified that errors appear in the printed specification of the above numbered patent requiring correction as follows:

Column 5, line 67, for the word "amplifiers" read *amplifier*; column 9, line 11, for "maens" read *means*; column 12, line 64, list of references cited, for "Dec. 19, 1941" read *Dec. 9, 1941*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*